United States Patent
Beck, Jr. et al.

(10) Patent No.: US 7,428,782 B1
(45) Date of Patent: Sep. 30, 2008

(54) PLOTTING BOARD WITH MAGNETIC PIVOT

(75) Inventors: Robert F. Beck, Jr., Franklin, NJ (US);
Amit J. Makhijani, Lakewood, NJ (US);
Jason P. Monico, Hoboken, NJ (US);
Ralph C. Tillinghast, Hardwick, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/457,154

(22) Filed: Jul. 13, 2006

Related U.S. Application Data

(60) Provisional application No. 60/595,569, filed on Jul. 15, 2005.

(51) Int. Cl.
*B43L 9/16* (2006.01)
*G01C 21/22* (2006.01)

(52) U.S. Cl. .................... 33/435; 33/1 SD; 33/DIG. 1

(58) Field of Classification Search .................. 33/1 N, 33/1 SB, 1 SD, 431, 435, DIG. 1
See application file for complete search history.

(56) References Cited

U.S. PATENT DOCUMENTS

| | | | | |
|---|---|---|---|---|
| 3,646,681 | A * | 3/1972 | Koenig | 33/1 SD |
| 3,721,007 | A * | 3/1973 | Banner | 33/1 SD |
| 3,723,928 | A * | 3/1973 | Blakey et al. | 33/DIG. 1 |
| 3,724,079 | A * | 4/1973 | Jasperson et al. | 33/1 SD |
| 3,947,969 | A * | 4/1976 | Gonzalez Martinez | 33/1 N |
| 4,095,342 | A * | 6/1978 | Oertli | 33/1 SD |
| 4,184,680 | A * | 1/1980 | Gage | 273/356 |
| 4,879,812 | A * | 11/1989 | Rabb | 33/431 |
| 4,934,061 | A * | 6/1990 | Knight et al. | 33/DIG. 1 |
| 5,167,076 | A * | 12/1992 | Sump | 33/431 |
| 5,732,474 | A * | 3/1998 | Cannon | 33/1 N |
| 6,134,796 | A * | 10/2000 | Johnson | 33/1 SD |
| 7,152,332 | B1 * | 12/2006 | Jain et al. | 33/1 SD |

\* cited by examiner

*Primary Examiner*—G. Bradley Bennett
(74) *Attorney, Agent, or Firm*—John F. Moran

(57) ABSTRACT

A plotting board includes a base; a top; a pivot that connects the top and the base, the top and the base being rotatable and detachable with respect to each other, the pivot including a magnet wherein at least a portion of the pivot is disposed at a substantially central point on the top.

8 Claims, 1 Drawing Sheet

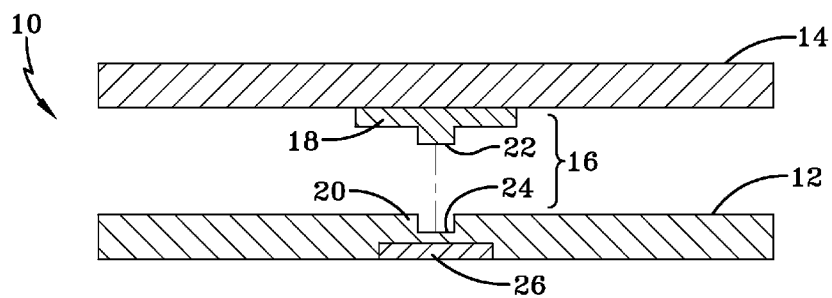
FIG-1
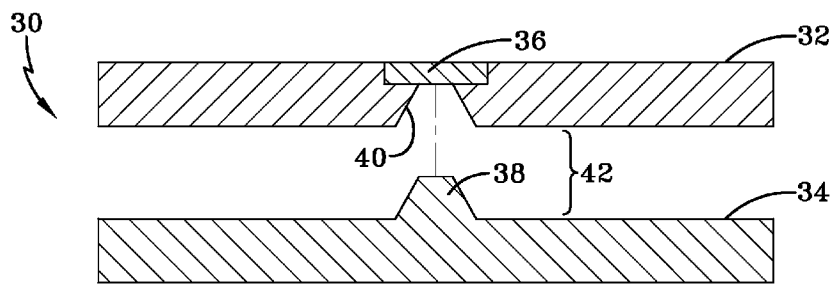
FIG-2
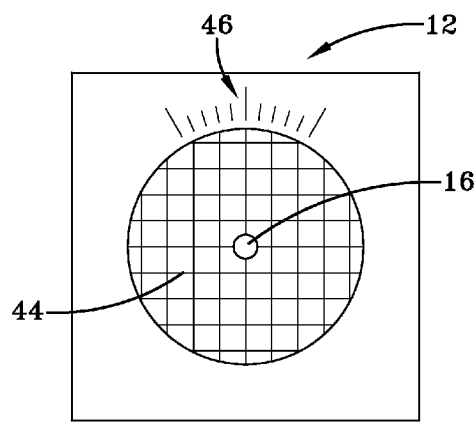
FIG-3A
FIG-3B

PLOTTING BOARD WITH MAGNETIC PIVOT

CROSS-REFERENCE TO RELATED APPLICATIONS

This application claims the benefit under 35 USC 119(e) of U.S. provisional patent application 60/595,569 filed on Jul. 15, 2005, which is hereby incorporated by reference.

STATEMENT OF GOVERNMENT INTEREST

The inventions described herein may be manufactured, used and licensed by or for the U.S. Government for U.S. Government purposes.

BACKGROUND OF THE INVENTION

The invention relates in general to munitions and in particular to plotting boards used to plot firing missions for a munition.

Soldiers may use a plotting board to calculate and plot firing missions for, for example, a mortar weapon system. The method of using the plotting board is known. A known plotting board comprises a base with a vertical pin or axle in its center. A top disk has a central hole and fits over the vertical pin in the base. The top disk also has a retaining clip to keep the disk in place. When the disk is removed from the base, the disk often fractures. Furthermore, because a soldier may slide a ruler across the base when plotting a fire mission, the presence of the vertical pin is an obstacle to effective use of the ruler. Thus, there is a need for a plotting board that is easier to use and disassemble.

SUMMARY OF THE INVENTION

It is an object of the invention to provide a plotting board having a surface substantially free of vertical projections.

It is another object of the invention to provide a plotting board having a top that is easily removed and reattached.

It is a further object of the invention to provide a plotting board wherein the top is held tightly to the bottom to minimize plotting error.

One aspect of the invention is an apparatus comprising a base; a top; a pivot that connects the top and the base, the top and the base being rotatable and detachable with respect to each other, the pivot including a magnet wherein at least a portion of the pivot is disposed at a substantially central point on the top. Preferably, the base and top comprise plates. The pivot includes male and female mating portions with the male portion disposed on one of the base and the top and the female portion disposed on the other of the base and the top.

The magnet may be disposed on the base or on the top. In one embodiment, the male and female mating portions comprise cylindrical shapes. In another embodiment, the male and female portions comprise frustro-conical shapes. Preferably, the top plate is substantially transparent and substantially circular.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a schematic side view of one embodiment of a plotting board in accordance with the invention.

FIG. 2 is a schematic side view of another embodiment of a plotting board in accordance with the invention.

FIG. 3A is a schematic top view of a top of a plotting board.

FIG. 3B is a schematic top view of a base of a plotting board.

DETAILED DESCRIPTION OF THE PREFERRED EMBODIMENTS

In one embodiment, the apparatus of the invention is a plotting board for use in calculating and plotting fire missions. However, the apparatus may be used in other applications as well.

FIG. 1 is a schematic side view of one embodiment of a plotting board 10 in accordance with the invention. Board 10 includes a base 12, a top 14 and a pivot 16 that connects the top 14 and the base 12. Base 12 and top 14 are preferably plate-like members. In FIG. 1, the pivot 16 comprises male and female mating portions 18, 20. The male portion 18 is shown on the top 14 and the female portion 20 is shown on the base 12. However, the positions of the male and female portions may be reversed. The male portion 18 of the pivot 16 is disposed substantially at the center of the top 14. The male portion 18 comprises a cylinder 22 and the female portion 20 comprises a cylindrical opening 24 for receiving the cylinder 22. The top 14 is rotatable and detachable with respect to the base 12.

The pivot 16 includes a magnet 26. The magnet 26 may be disposed on the base 12, as shown, or on the top 14. The magnet 26 may be integral with or separate from the base 12, top 14, male portion 18 or female portion 20. If the top 14 or male portion 18 includes the magnet 26, then a part of the base 12 or female portion 20 comprises a magnetic material that is attracted to the magnet 26. Similarly, if the base 12 or female portion 20 comprises the magnet 26, then a part of the top 14 or male portion 18 comprises a magnetic material that is attracted to the magnet. In this context, "magnetic material" includes any material that is attracted to a magnet, such as ferrous material, and also includes a second magnet. If a second magnet is used, then the poles of the magnet 26 and the second magnet are disposed so that the top 14 is attracted to the base 12.

FIG. 2 is a schematic side view of another embodiment of a plotting board 30 in accordance with the invention. Board 30 comprises a top 32, a base 34 and a pivot 42 that connects the top 32 to the base 34. Pivot 42 comprises male and female mating portions 38, 40. The male portion 38 is shown on the base 34 and the female portion 40 is shown on the top 32. However, the positions of the male and female portions may be reversed. The male portion 38 comprises a frustrum of a cylinder and the female portion 40 comprises a similarly shaped mating opening. A magnet 36 is shown in the top 32. Shapes other than cylindrical and frusto-conical may be used for the male and female portion of the pivot.

FIG. 3A is a top view of a top 14 of a plotting board 10. For use as a plotting board, the top 14 is substantially transparent and preferably circular. The top 14 includes suitable scale markings 28 on its outer circumference. FIG. 3B is a top view of a base 12 of a plotting board 20. Base 12 is preferably made of honeycomb aluminum. Base 12 includes a rectangular grid

44 on the portion of its surface that is covered by the top 14. Base 12 may also include suitable scale markings 46 around all or a portion of the outer periphery of the top.

The magnetic pivot of the invention provides a means to easily attach and reattach the top to the base without fracturing the top. The magnetic pivot further provides a secure connection between the top and the base to minimize errors in calculations. In addition, the magnetic pivot does not protrude vertically above the top so that a ruler can slide smoothly over the plotting board.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A plotting board, comprising:
    a base plate;
    a substantially transparent, circular top plate;
    a pivot that holds the top plate tightly to the base plate, the top plate and the base plate being rotatable and detachable with respect to each other, the pivot including a magnet wherein at least a portion of the pivot is disposed at a substantially central point on the top plate;
    the pivot including male and female mating portions with the male portion disposed on one of the base plate and the top plate and the female portion disposed on the other of the base plate and the top plate.

2. The plotting board of claim 1 wherein the magnet is disposed on the base plate.

3. The plotting board of claim 1 wherein the magnet is disposed on the top plate.

4. The plotting board of claim 1 wherein the male and female mating portions comprise cylindrical shapes.

5. The plotting board of claim 1 wherein the male and female portions comprise frustro-conical shapes.

6. The plotting board of claim 1 wherein the top plate includes scale markings on its outer circumference.

7. The plotting board of claim 1 wherein the base plate includes a rectangular grid on a surface substantially covered by the top plate.

8. The plotting board of claim 1 wherein the base plate includes scale markings disposed adjacent an outer periphery of the top plate.

\* \* \* \* \*